United States Patent
Robinson et al.

(10) Patent No.: US 9,371,739 B2
(45) Date of Patent: Jun. 21, 2016

(54) POWER PRODUCING DEVICE WITH CONTROL MECHANISM

(71) Applicant: Raytheon Company, Waltham, MA (US)

(72) Inventors: Brendan H Robinson, Rancho Palos Verdes, CA (US); John K Yook, Fullerton, CA (US); John H Steele, Palos Verdes Estate, CA (US)

(73) Assignee: Raytheon Company, Waltham, MA (US)

( * ) Notice: Subject to any disclaimer, the term of this patent is extended or adjusted under 35 U.S.C. 154(b) by 780 days.

(21) Appl. No.: 13/734,236

(22) Filed: Jan. 4, 2013

(65) Prior Publication Data

US 2014/0193236 A1    Jul. 10, 2014

(51) Int. Cl.
| | |
|---|---|
| F03D 9/00 | (2006.01) |
| H02P 9/04 | (2006.01) |
| B64D 41/00 | (2006.01) |
| F01D 17/02 | (2006.01) |

(52) U.S. Cl.
CPC .............. F01D 17/02 (2013.01); B64D 41/007 (2013.01)

(58) Field of Classification Search
USPC ........... 290/44, 55; 244/58; 415/49; 60/226.3
See application file for complete search history.

(56) References Cited

U.S. PATENT DOCUMENTS

| | | | | |
|---|---|---|---|---|
| 4,587,803 A | * | 5/1986 | Nightingale | ............ F02K 3/075 244/12.5 |
| 4,770,368 A | * | 9/1988 | Yates | ...................... B64D 3/02 244/1 TD |
| 5,113,649 A | * | 5/1992 | Siedlecki, Jr. | ............ F02C 7/18 60/226.3 |
| 5,182,905 A | * | 2/1993 | Stransky | ................... F02C 7/18 60/204 |
| 5,184,461 A | * | 2/1993 | Stransky | ................... F02C 7/18 60/226.3 |
| 5,505,587 A | * | 4/1996 | Ghetzler | ............. B64D 41/007 415/144 |
| 5,820,074 A | * | 10/1998 | Trommer | ............. B64D 41/007 244/58 |
| 6,270,309 B1 | * | 8/2001 | Ghetzler | ............. B64D 41/007 137/15.1 |
| 6,865,935 B2 | | 3/2005 | Vandervort | |
| 6,904,353 B1 | * | 6/2005 | Kolavennu | .......... F02D 41/0007 60/602 |

(Continued)

FOREIGN PATENT DOCUMENTS

| | | |
|---|---|---|
| DE | 102009010243 A1 | 9/2010 |
| EP | 0008584 A1 | 3/1980 |

(Continued)

OTHER PUBLICATIONS

International Search Report and Written Opinion from corresponding International Application No. PCT/US2013/075666, mailed on Oct. 30, 2014.

*Primary Examiner* — Pedro J Cuevas
(74) *Attorney, Agent, or Firm* — Renner, Otto, Boisselle & Sklar, LLP

(57) ABSTRACT

A power-producing device, such as a ram air turbine, includes a controller that is used to control operation of a turbine of the power-producing device. The controller uses an input based on an airspeed of the aircraft as part of a control mechanism in the controller for controlling the turbine. For example controller may be used to control backpressure of the turbine, for example by controlling the angle of doors of that are used to adjust backpressure of the turbine. The control mechanism may include a PID controller, with the gain of one or more of the values of the PID controller being a function of the airspeed of the aircraft. In addition the control mechanism may include manipulating a setpoint as a function of load on the power-producing device. The power-producing device may be part of a detachable pod that is installed on the aircraft.

16 Claims, 4 Drawing Sheets

(56) References Cited

U.S. PATENT DOCUMENTS

| | | | |
|---|---|---|---|
| 7,841,163 B2* | 11/2010 | Welch | F02C 7/262 60/226.1 |
| 8,365,513 B2* | 2/2013 | McVey | F02K 1/1207 60/204 |
| 2005/0137777 A1* | 6/2005 | Kolavennu | F02D 41/0007 701/102 |
| 2006/0137355 A1* | 6/2006 | Welch | B64D 41/007 60/772 |
| 2008/0110151 A1* | 5/2008 | Welch | F02C 7/262 60/39.091 |
| 2010/0011740 A1* | 1/2010 | McVey | F02K 1/1207 60/204 |
| 2012/0299558 A1 | 11/2012 | Justak et al. | |
| 2013/0204544 A1* | 8/2013 | Thomas | G01P 21/025 702/41 |
| 2015/0137523 A1* | 5/2015 | Sia | F03D 9/002 290/55 |
| 2016/0004255 A1* | 1/2016 | Moxon | G05D 1/0055 701/7 |

FOREIGN PATENT DOCUMENTS

| | | |
|---|---|---|
| EP | 2399829 A2 | 12/2011 |
| WO | 0038985 A2 | 7/2000 |
| WO | 2006087139 A1 | 8/2006 |

* cited by examiner

POWER PRODUCING DEVICE WITH CONTROL MECHANISM

GOVERNMENT LICENSE RIGHTS

This invention was made with Government support under contract N00019-10-C-0073 awarded by the Naval Air Systems Command. The Government has certain rights in the invention.

BACKGROUND OF THE INVENTION

1. Field of the Invention

The invention is in the field of power-producing devices.

2. Description of the Related Art

Ram air turbines (RATs) are used to generate power from a passing airstream. Power-producing devices that include turbines can be used in aircraft, such as in add-on pods, to power any of a variety of equipment.

SUMMARY OF THE INVENTION

Ram air turbines can be operated most efficiently when the turbine speed is kept in a narrow range of rotational speeds. It would be desirable to have a control system that would keep the turbine operating at a given speed range over a variety of conditions, such as (for example) different airspeeds and altitudes.

According to an aspect of the invention, a ram air turbine uses a mechanism for control, with the gain for at least part of the mechanism being a function of a variable based at least in part on airspeed.

According to another aspect of the invention, a power-producing ram air device that is part of an aircraft, the power-producing device including: a turbine; and a controller operatively coupled to the turbine for controlling operation of the turbine. The controller controls the turbine using a mechanism, the mechanism based at least in part on an input based on an airspeed and/or an altitude of the aircraft.

According to yet another aspect of the invention, a method of controlling a power-producing device that is part of an aircraft includes: controlling operation of a turbine that is part of the power-producing device; wherein controlling the controller includes using a control mechanism of the controller to control operation of the turbine, wherein the control mechanism is based at least in part on an input based on an airspeed of the aircraft.

According to a further aspect of the invention, a method of controlling a power-producing device that is part of an aircraft includes: using a controller of the aircraft to control backpressure for a turbine that is part of the power-producing device; wherein the using the controller includes manipulating a setpoint of a control mechanism of the controller, as a function of load on the power-producing device.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A power-producing device, such as a ram air turbine, includes a controller that is used to control operation of a turbine of the power-producing device. The controller uses an input based on an airspeed of the aircraft and altitude of the aircraft as part of a mechanism in the controller for controlling the turbine. For example controller may be used to control backpressure of the turbine, for example by controlling the angle of doors of that are used to adjust backpressure of the turbine. The mechanism may include a PID controller, with the gain of one or more of the values of the PID controller being a function of the airspeed of the aircraft and the altitude of the aircraft. In addition the mechanism may include manipulating a setpoint as a function of load on the power-producing device. The power-producing device may be part of a detachable pod that is installed on the aircraft. The power-producing device may be used to power devices on the pod, such as electronics devices. The power-producing device has the advantage of accurately enabling the turbine to operate within a desired range of rotational speed, allowing more efficient operation of the power-producing device.

Figure 1:
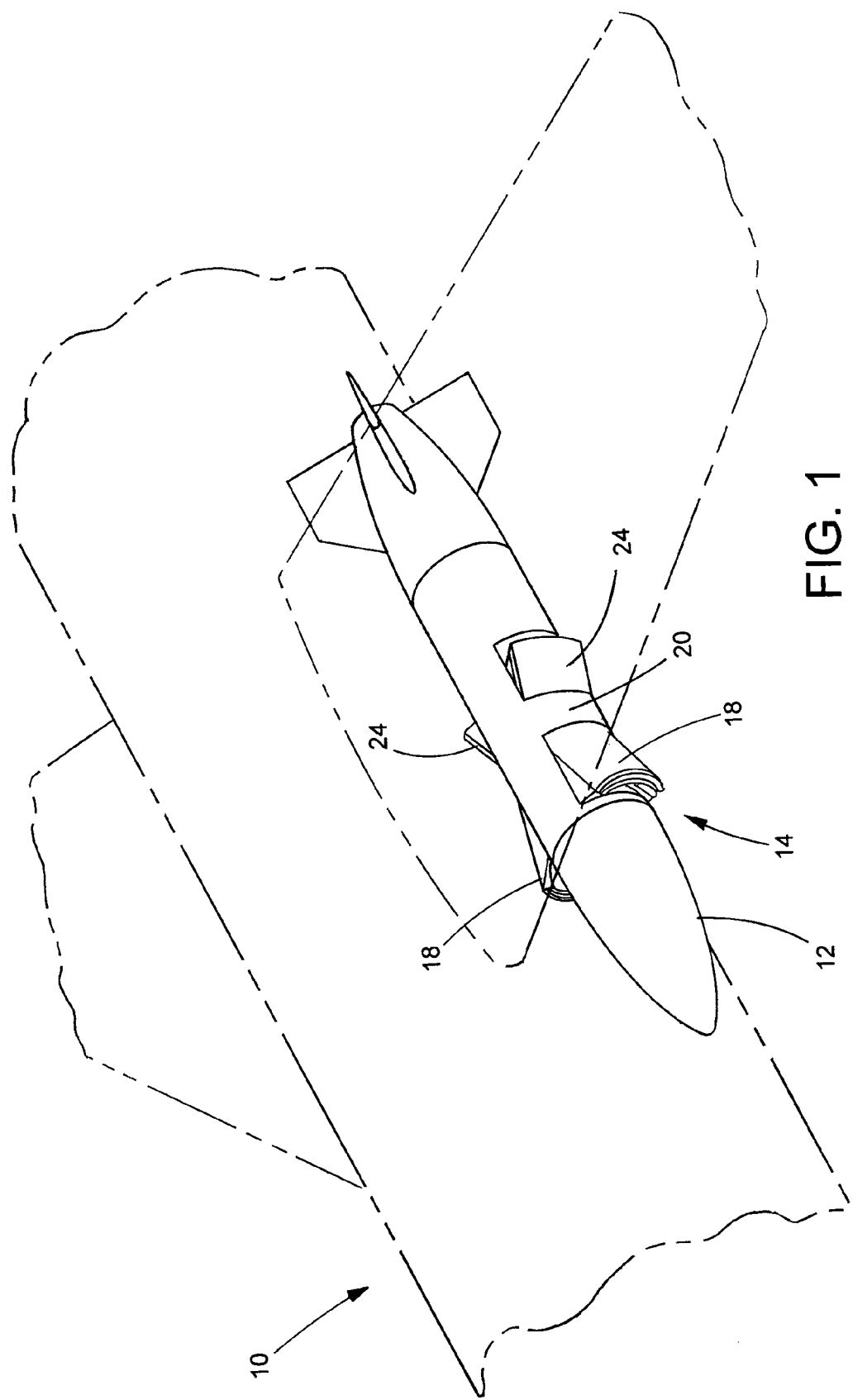
FIG. 1 is an oblique view of an aircraft with a power-producing device in accordance with an embodiment of the invention.

FIG. 1 shows an aircraft 10 that includes a detachable pod 12 that includes a power-producing device 14, a ram air turbine device. The power-producing device 14 generates electricity by directing air from the airstream passing by the aircraft 12 in inlet openings defined by inlet doors 18 in the pod 12. The air then passes through and turns a turbine 20 within the pod 12, and exits the pod 12 through outlet openings defined by outlet doors 24 in the pod 12. As the turbine 20 turns, it produces electric power which is used to power equipment which may be in the pod 12. The equipment may be any of a variety of types of equipment, for instance electronic jamming equipment, weapons, or sensors.

Figure 2:
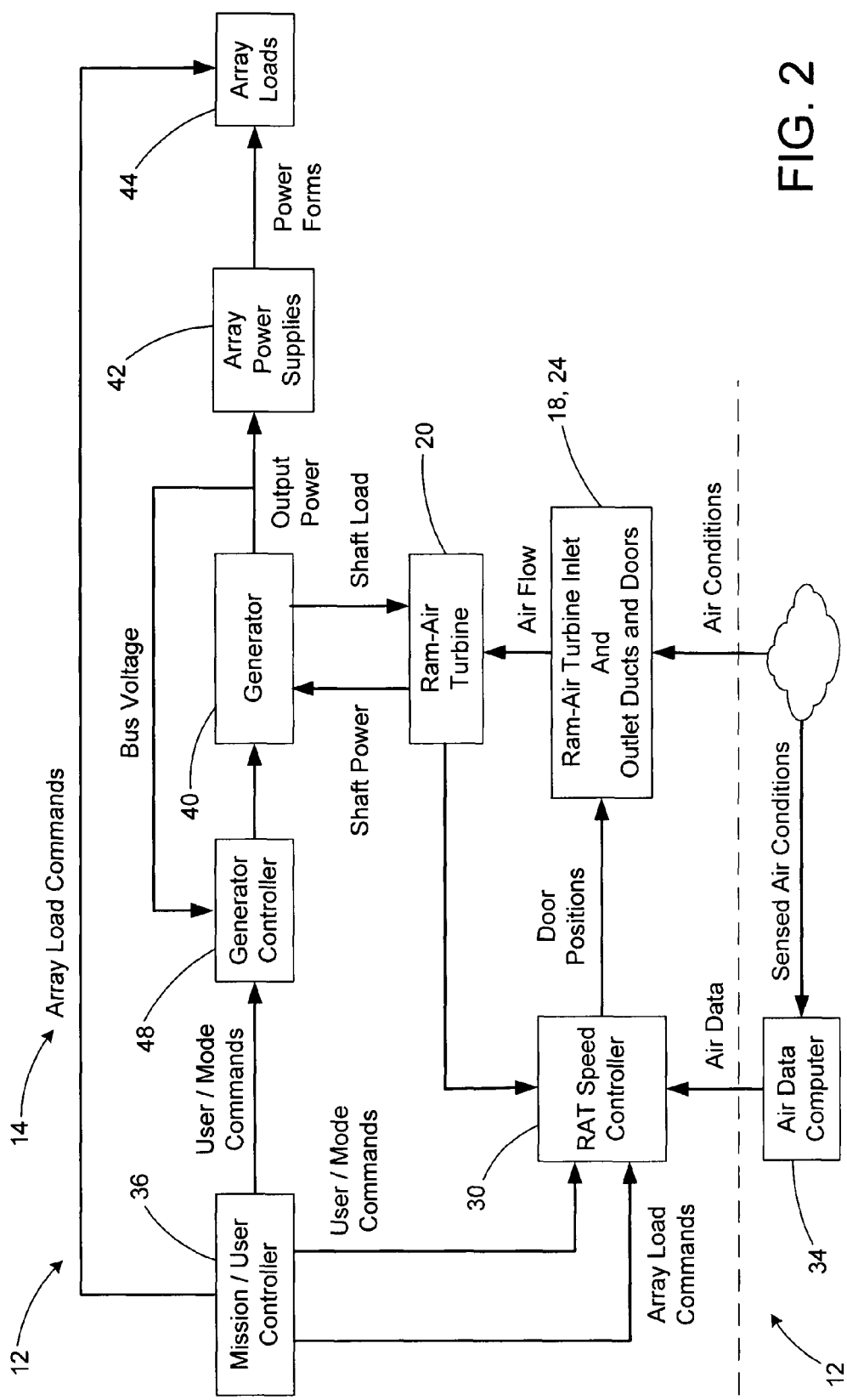
FIG. 2 is a schematic diagram of the interaction between parts of the power-producing device of FIG. 1, as well as interaction between those parts and other parts of the aircraft.

FIG. 2 shows a schematic of many components of the device 14, along with the operative connections between the components. A turbine speed controller 30 that is part of the power-producing device 14 controls the inlet doors 18 and outlet doors 24, to control the shaft rotation speed of the turbine 20. Specifically, the position outlet doors 24 may be set to control the backpressure of the turbine 20. The turbine speed controller 30 may be or may include an integrated circuit or equivalent device. The functions of the controller 30 may be carried out in logic that is embodied in hardware and/or software. As described in further detail below, the turbine speed controller 30 uses a mechanism, akin to a feedback mechanism, to set the door positions of the inlet doors 18 and the outlet doors 24.

The controller 30 receives different data inputs for use in the control mechanism. The turbine 20 provides a shaft speed to the controller 30. An air data computer or sensor 34 provides air data to the controller 30. The computer or sensor 34 may be part of the aircraft 10 that is outside of the pod 12. For example the computer 34 may be a computer coupled to one or more sensors of the aircraft 10, for example used in gathering data and controlling flight of the aircraft 10. The computer 34 may thus be part of the avionics of the aircraft 10. Alternatively the computer or sensor 34 may be a part of the pod 12, for example being a pitot tube or other airspeed sensor.

The data provided to the turbine speed controller 30 by the computer or sensor 34 may include an input based on an airspeed of the aircraft 10 and an altitude of the aircraft 10. The data input may be the airspeed of the aircraft 10, or something derivable from the airspeed of the aircraft 10. For example the data input may include the Mach number of the aircraft 10.

The data provided by the computer or sensor 34 may include other air data, for instance the altitude of the aircraft. The data may include a standard-atmosphere free stream dynamic pressure Q. Alternatively the free stream dynamic pressure Q may be calculated from other data, for example in the controller 30.

A mission/user controller 36 provides user/mode commands and array load commands to the turbine speed controller 30. The mission controller 36 allows active control of the power-producing device 14, such as by a user of the aircraft 10 or by a remote operator (through a remote communication device, for instance). The mission/user controller 36 may allow changing modes of operation of the power-producing device 14.

The mission controller 36 may also send load information to the turbine speed controller 30. The load information may be used in manipulating a setpoint in the control mechanism of the turbine speed controller 30, as discussed in greater detail below.

The turbine 20 is used to power a generator 40, to produce energy to be sent to power supplies 42 for handling power loads 44 of any of a variety of kinds of equipment. The generator 40 receives shaft power from the turbine 20, which is equal to the shaft load imposed by the generator 40 on the turbine 20. A generator controller 48 receives feedback from the generator 40, to aid the generator controller 48 in regulating output power. The generator controller 48 may receive commands from the mission/user controller 36.

Output power from the generator 40 is forwarded to the power supplies 42. The power supplies 42 may convert the power output by the generator 40 into power forms suitable for handling loads 44 on equipment of the aircraft 10. Information on the power loads 44 may be provided to the mission/user controller 36 for use in controlling operation of the device 14.

The separate parts shown in FIG. 2 are not necessarily separate components. For example the functions of the controllers 30, 36, 48 may be combined in a single device.

Figure 3:
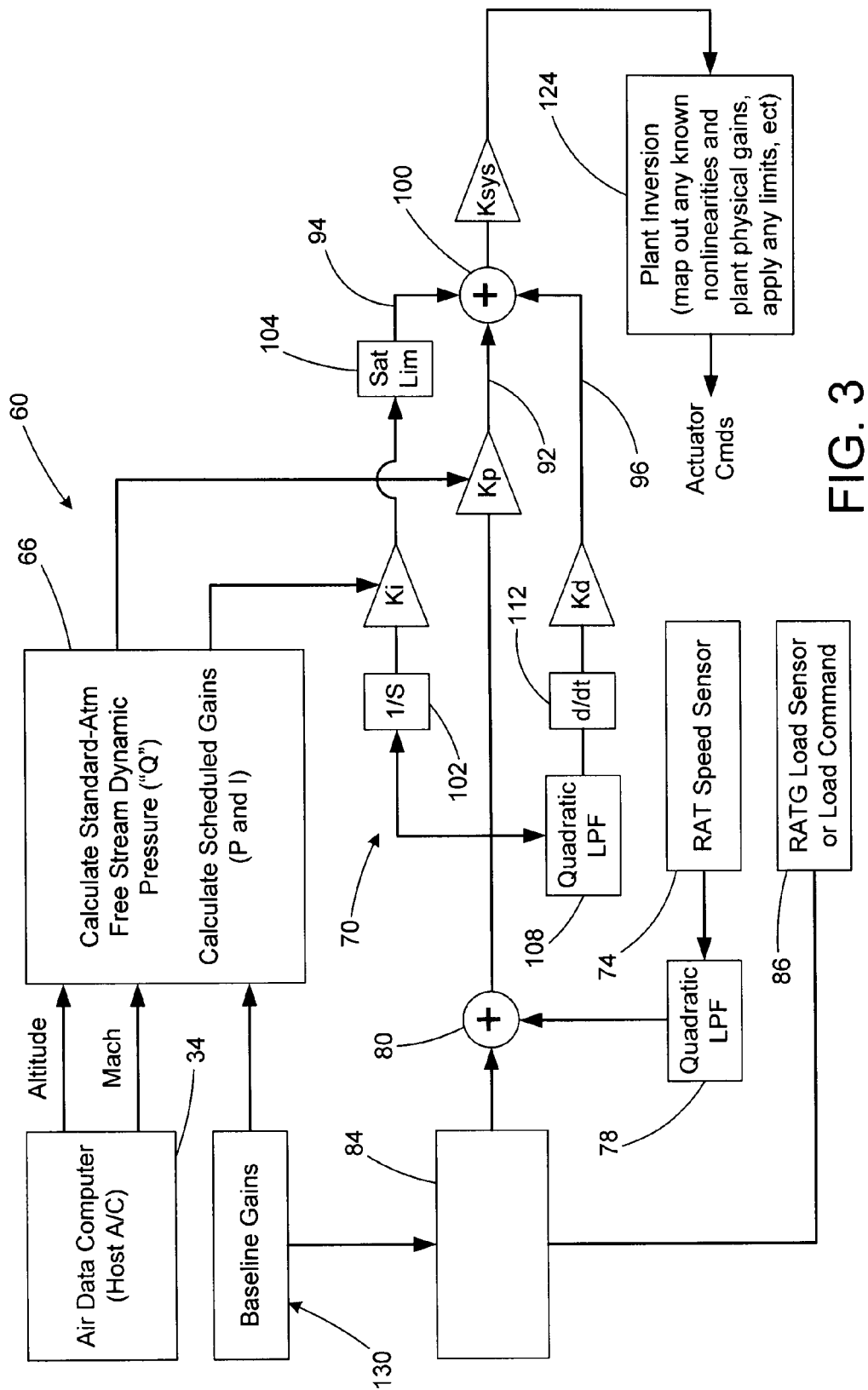
FIG. 3 is a control block diagram illustrating operation of the controller (the logic of the controller) of the power-producing device of FIG. 1.

FIG. 3 shows a schematic diagram illustrating operation of the controller 30. In particular, the control mechanism 60 of the controller 30 is illustrated in FIG. 3. The mechanism 60 is used to control actuators, such as hydraulic or electrical actuators, that are used to adjust position of the inlet doors 18 (FIG. 1) and the outlet doors 24 (FIG. 1). Inputs for the mechanism 60 include data from the air data computer or sensor 34, such as Mach number and altitude. This data may be processed in the controller 30 to calculate the standard-atmosphere free-stream dynamic pressure Q, such as shown at calculation module 66. The dynamic pressure Q is used in calculating and adjusting gains used in a proportional-integral-derivative (PID) portion 70 of the mechanism 60.

A speed sensor 74 is coupled to the turbine 20 (FIG. 2). The speed sensor provides an input for the mechanism 60 to act on, after passing through a quadratic low pass filter 78. The filtered speed sensor data is combined with a variable setpoint output by a setpoint modification 84, at summing junction 80. The setpoint modification 84 receives load data from a load sensor or load command 86, used for modifying the setpoint. The load sensor or load command 86 may include the mission/user controller 36 (FIG. 2). Alternatively information from a separate load sensor may be sent to the setpoint modification 84 directly, or through the mission/user controller 36.

The setpoint modification 84 is used to modify the no-load setpoint in view of the present load from the loads 44 (FIG. 2) drawing power from the power-producing device 14. As explained in greater detail below, the setpoint is modified to allow better performance for the device 14, better maintaining the turbine 20 (FIG. 2) in a desired range of speeds, as the load on the system changes.

The combined variable setpoint and the sensed turbine speed are put through the PID portion 70 of the mechanism 60. In the PID portion 70 a proportional value 92, an integral value 94, and a derivative value 96 are combined at a downstream end summing junction 100 of the PID portion 70. The proportional value 92 is a measure of the present error (difference between the turbine speed and the modified setpoint). The integral value 94 is a measure of accumulation of past errors. The derivative value 96 is a prediction of future errors, based on current rate of change The proportional value 92 takes the output from the summing junction 80 (the difference between the sensed rotation rate of the turbine 20 and the modified setpoint, for instance). A simple gain Kp is applied to the difference to get the proportional value.

To obtain the integral value 94 an integral function 102 is applied to the output from the summing junction 80. A gain Ki is applied to the result, and filtering may be applied, such as by applying a saturation limit 104 to protect against errors in the integration.

The derivative value 96 may be passed through a low-pass filter 108, to remove noise, and then a derivative function (a difference relative to time) 112 is applied. The output from the derivative function 112 has a gain Kd applied to it to obtain the derivative value 96.

Downstream of the summing junction 100 a system gain Ksys is applied to the combined values. A further modification 124 may then be applied, taking into account such factors as known nonlinearities in the actuator systems, plant physical gains (one or more equations that describe variation of power as a function of door angle), limits in output, or other adjustments.

At least one of the PID gains Kp, Ki, and/or Kd is variable, for instance being a function of an input that is based on the airspeed and altitude of the aircraft 10. Two of the PID gains may be variable, a function of an input that is based on the airspeed and altitude of the aircraft 10. In the illustrated embodiment the gains Kp and Ki are inversely proportional to the dynamic pressure Q. Alternatively, the gains of the PID portion 70 may vary with Q in other ways. The gains Kp and Ki may be calculated in the calculation module 66, where the dynamic pressure Q is also calculated. Whenever the dynamic pressure Q changes, the gains Kp and Ki may also be updated.

Baseline gains 130 may be input into the calculation module 66 and the setpoint modification 84, to set initial conditions for the gains Ki and Kp, and for the variables used in the setpoint modification 84. These initial conditions may be different for different systems that the device 14 may be used with. For example, different baseline gains 130 may be used when mounting the pod 12 (FIG. 1) to different types of aircraft. The baseline gains 130 may be varied in order to increase the flexibility in use of the device 14.

Figure 4:
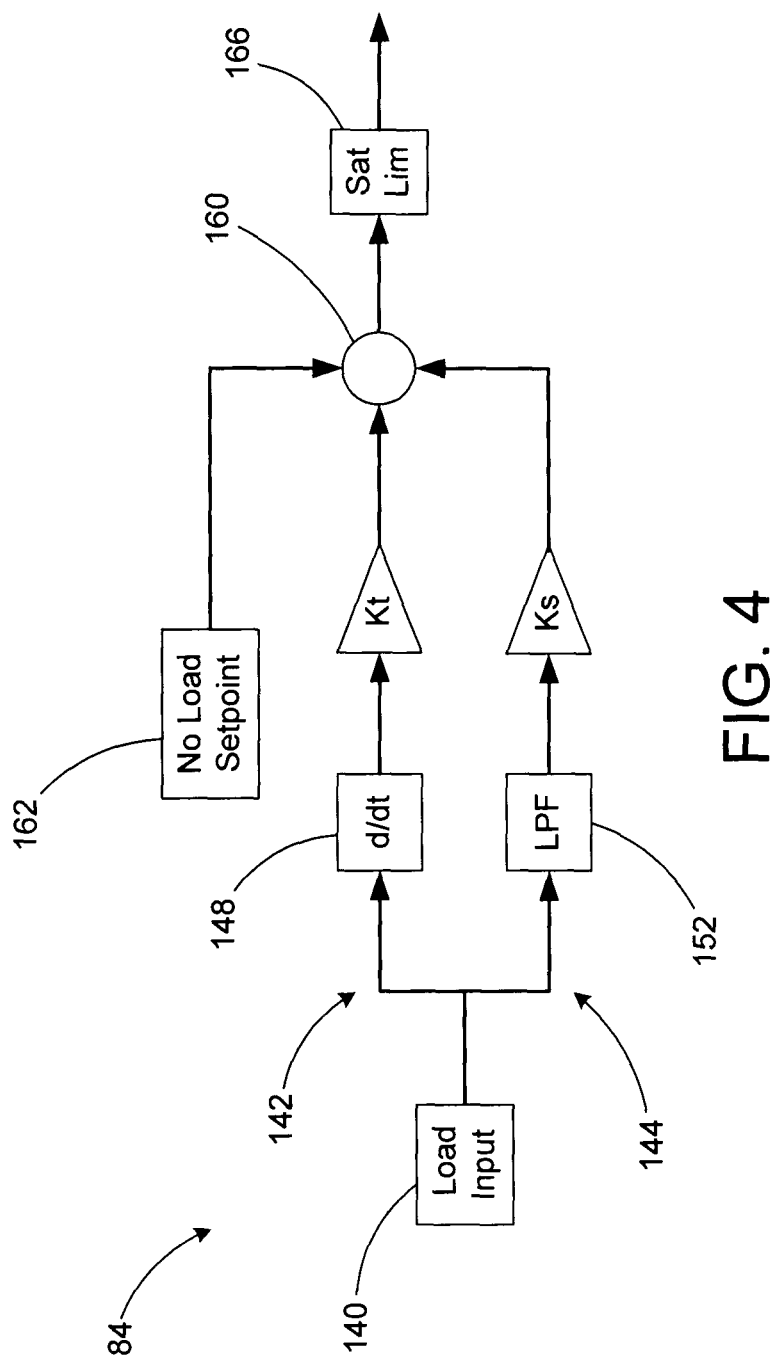
FIG. 4 is a control block diagram of illustrating operation of the setpoint modification of the controller of FIG. 3.

FIG. 4 shows details on how the variable setpoint is modified in the setpoint modification 84, using a load input 140. The load input 140 is routed through two parallel paths 142 and 144. The first path 142 has a "derivative" 148, an estimate of the change of the load input 140 over time, with some filtering added. The transient produced by this derivative estimation is subjected to a transient gain Kt.

In the second path 144 the load input 140 is passed through a filter 152, such as a low pass filter. The filtered value is subjected to a steady-state gain Ks. The values produced by the two paths 142 and 144 are combined at summing junction 160 with a no-load setpoint (unmodified setpoint) 162. The result may then be filtered again by being subjected to a saturation limit 166, before being sent to be combined with speed sensor data at the summing junction 80 (FIG. 3).

The device 14 offers many advantages over prior ram air turbines. The variation of gains in the PID controller helps stabilize system operation over a broad flight regime. This allows the device 14 to operate under a narrow range of turbine rotation speeds at a variety of air speeds and altitude. This narrow range of turbine rotation speeds may be obtainable over variations of flight dynamic pressure that vary by a factor of 6 or more. This allows for more efficient operation, since turbines can advantageously be finely tuned for operation over a narrow range of speeds.

The manipulation of variable setpoint, using the setpoint modification 84, also provides advantages in operation. This feature improves transient response by initially driving the setpoint 84 in the same direction as changes in the load (e.g., down if the load is reduced), and then later in the opposite direction of the new steady load (e.g., high if the new load is low). This results in the transient response of a system having much higher bandwidth, but without actually increasing the bandwidth (such as by increasing one or more of the gains Ki, Kp, and Kd). Increasing the bandwidth might result in stability problems. By manipulating the variable setpoint 84, if may be possible to use an actuation mechanism that is slow and latent. Requirements on hardware and electronics are reduced by use of setpoint manipulation.

Many of the above advantages extend well beyond the embodiments described above. The control as described above may be used for controlling other aspects of ram air turbines, and for other types of power-producing devices such as other types of air turbines. The control (control mechanisms with gain scheduling and/or setpoint modification) may be used for controlling pitch of turbine blades, angle of guide vanes that direct air into or out of turbines, and modification of geometry of diffusers, to name just a few other possibilities.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power-producing ram air device that is part of an aircraft, the power-producing device comprising:
   a turbine; and
   a controller operatively coupled to the turbine for controlling operation of the turbine;
   wherein the controller includes a calculation module and a setpoint modification module; and
   wherein the controller controls the turbine based at least in part on an input based on an airspeed of the aircraft and an altitude, and baseline gains.

2. The device of claim 1, wherein the power-producing device is a detachable pod that is coupled to other parts of the aircraft.

3. The device of claim 2, wherein the pod receives the input based on the airspeed from other parts of the aircraft.

4. The device of claim 1, wherein the controller controls backpressure in the turbine, based in part on the input that is based on the airspeed and the altitude of the aircraft.

5. The device of claim 4,
   further comprising backpressure doors operatively coupled the controller;
   wherein the controller controls an angle at which the backpressure doors are open, based in part on the input that is based on the airspeed and the altitude of the aircraft.

6. The device of claim 1,
   wherein the controller includes a proportional-integral-derivative (PID) controller mechanism that controls the turbine;
   wherein the PID controller mechanism includes application of a proportional value, an integral value, and a derivative value; and
   wherein a gain on at least one of the values is a function of the input that is based on the airspeed and the altitude of the aircraft.

7. The device of claim 6, wherein the gains on at least two of the values are a function of the input that is based on the airspeed and the altitude of the aircraft.

8. The device of claim 6, wherein the gain of the least one of the values is inversely proportional to a dynamic pressure Q.

9. The device of claim 1, wherein the controller controls the turbine by the setpoint modification module manipulating a setpoint as a function of load on the power-producing device.

10. A method of controlling a power-producing device that is part of an aircraft, the method comprising:
    controlling operation of a turbine that is part of the power-producing device;
    wherein the controlling includes using a calculation module and a setpoint modification module of the controller to control operation of the turbine, wherein the control mechanism is based at least in part on an input based on an airspeed of the aircraft and an altitude, and baseline gains.

11. The method of claim 10,
    wherein the power-producing device is a detachable pod that is coupled to other parts of the aircraft; and
    wherein the controlling includes the pod receiving the input based on the airspeed from other parts of the aircraft.

12. The method of claim 10, wherein the controlling includes controlling backpressure in the turbine using the controller, based in part on the input that is based on the airspeed of the aircraft.

13. The method of claim 12, wherein the controlling the backpressure including using the controller to control an angle at which the backpressure doors are open, based in part on the input that is based on the airspeed and the altitude of the aircraft.

14. The method of claim 10,
wherein the controller includes a proportional-integral-derivative (PID) controller mechanism that controls the turbine;
wherein the PID controller mechanism includes combination of a proportional value, an integral value, and a derivative value; and
wherein the controlling includes varying a gain on at least one of the values as a function of the input that is based on the airspeed and the altitude of the aircraft.

15. A method of controlling a power-producing device that is part of an aircraft, the method comprising:
controlling operation of a turbine that is part of the power-producing device;
wherein the controlling includes using a control mechanism of the controller to control operation of the turbine, wherein the control mechanism is based at least in part on an input based on an airspeed of the aircraft and an altitude;
wherein the control mechanism of the controller includes a proportional-integral-derivative (PID) controller mechanism that controls the turbine;
wherein the PID controller mechanism includes combination of a proportional value, an integral value, and a derivative value;
wherein the controlling includes varying a gain on at least one of the values as a function of the input that is based on the airspeed and the altitude of the aircraft; and
wherein the varying the gain includes varying the gain inversely proportional to dynamic pressure Q.

16. The method of claim 15, wherein the controlling includes the controller controlling the turbine by manipulating a setpoint of the control mechanism, as a function of load on the power-producing device.

\* \* \* \* \*